April 20, 1937.   E. P. SEGHERS   2,077,590
PERCOLATOR TOP
Filed Dec. 28, 1935   2 Sheets-Sheet 1
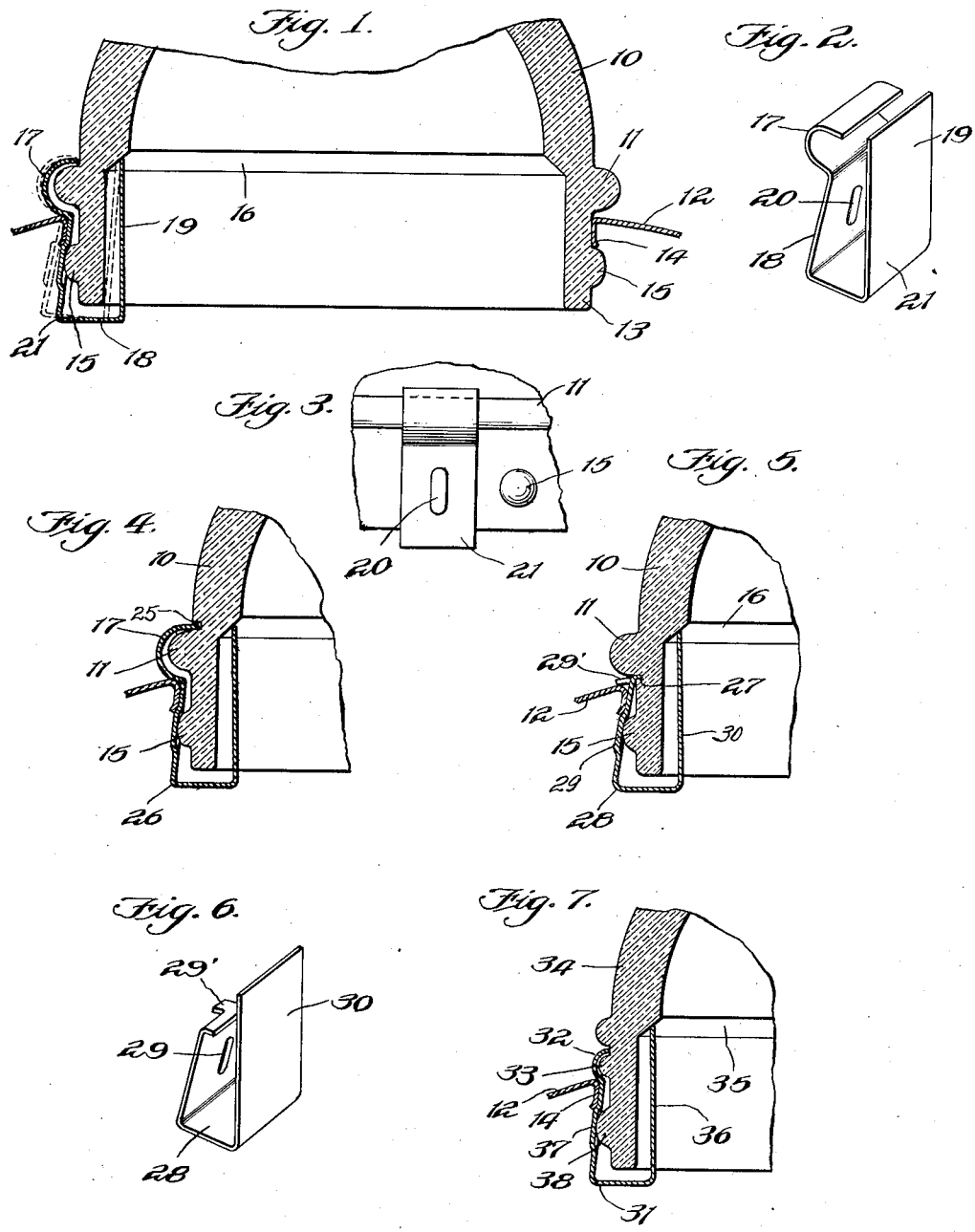
INVENTOR.
Emiel P. Seghers
BY George H. Simmons
ATTORNEY.

April 20, 1937.  E. P. SEGHERS  2,077,590
PERCOLATOR TOP
Filed Dec. 28, 1935    2 Sheets-Sheet 2
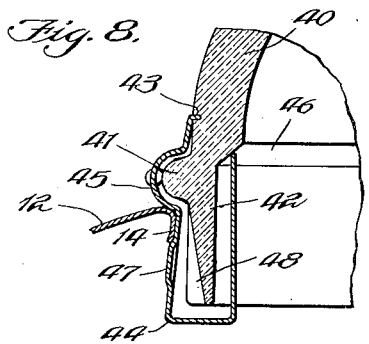
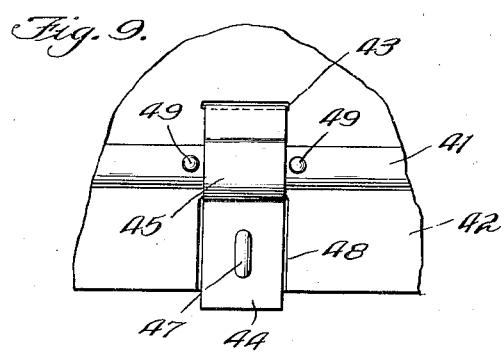
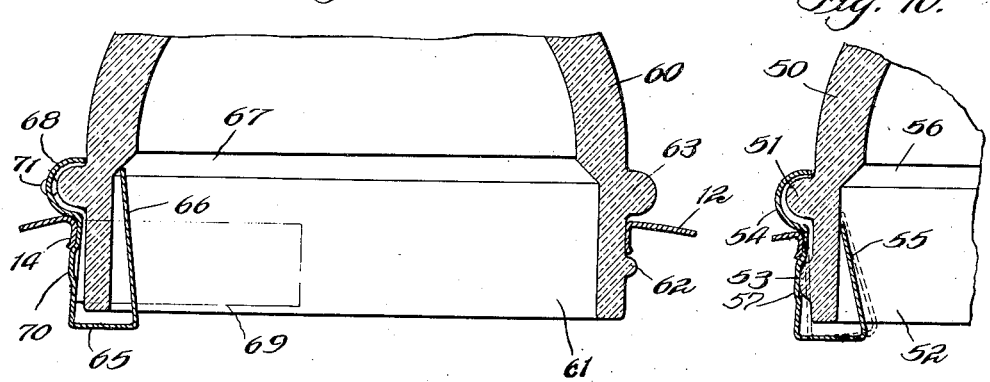
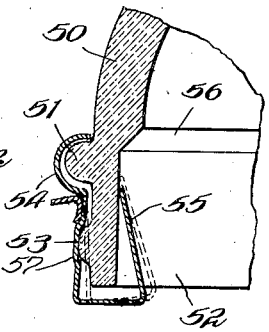
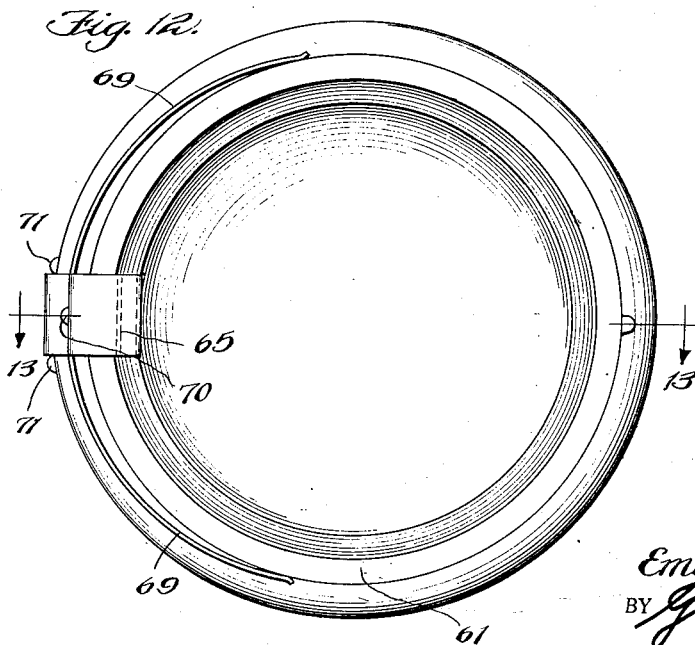
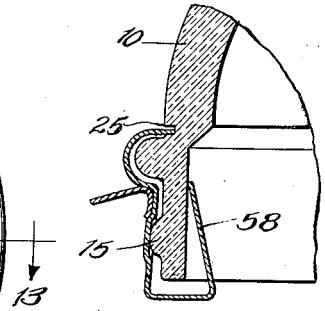
INVENTOR.
Emiel P. Seghers
BY George H. Simmons
ATTORNEY.

Patented Apr. 20, 1937

2,077,590

UNITED STATES PATENT OFFICE 2,077,590

PERCOLATOR TOP

Emiel P. Seghers, Chicago, Ill.

Application December 28, 1935, Serial No. 56,448

29 Claims. (Cl. 53—3)

This invention relates to tops for percolator covers and the like, and has for its principal object the provision of a new and improved top that may be securely fixed in the lid of an existing percolator or vessel.

Another object of the invention lies in the provision of a top capable of being used as a replacement unit and being fitted into a variety of different lids, none of which is provided with special devices for retaining the top in place in the lid.

Further objects of the invention not specifically mentioned herein will be apparent from the detailed description and claims which follow, reference being had to the accompany drawings in which a preferred embodiment of the invention is shown by way of example, and in which:

Fig. 1 is a fragmentary cross-sectional view of a top embodying the invention in place in a lid;

Fig. 2 is a perspective view of the clip employed to lock the top in place in the lid;

Fig. 3 is a fragmentary elevational view of the top, showing the location of the clip thereon;

Fig. 4 is a fragmentary cross-sectional view showing a modified form of the invention;

Fig. 5 is a view similar to Fig. 4, showing still another form of the invention;

Fig. 6 is a perspective view of the retaining clip shown in the embodiment of the invention shown in Fig. 5;

Fig. 7 is a fragmentary cross-sectional view showing the application of the clip of the invention to a slightly different form of percolator top;

Fig. 8 is a fragmentary cross-sectional view showing another form of the invention.

Fig. 9 is a fragmentary elevational view of the top shown in Fig. 8;

Fig. 10 is a fragmentary cross-sectional view showing another form of clip;

Fig. 11 is a view similar to Fig. 4, showing the application of a clip of the type shown in Fig. 10 to the top of a type shown in Fig. 4;

Fig. 12 is a bottom side plan view of a top showing the application of a modified form of clip thereto; and Fig. 13 is a cross-sectional view taken substantially along the line 13—13 of Fig. 12, looking in the direction of the arrows.

In the prior art of which I am aware, numerous attempts have been made to provide a percolator top which can be securely fixed in the lid of a percolator and maintained therein even after the lid has become worn. Most percolator lids are provided with a centrally located opening, usually circular, around which is formed a flange that depends inwardly of the percolator. Orthodox percolator tops are provided with an apron from which are projected lugs that are adapted to slide through suitable openings in the lid and then be brought into engagement with the flange of the lid by a rotation of the top, forming a bayonet joint for holding the top upon the percolator.

The coefficient of expansion of glass is different from that of the metal of which the percolator is composed, and after the percolator has been used a short time the flange of the lid is backed away from the apron of the top sufficiently far that the lugs on the apron do not securely hold the top in the lid. This is particularly true if the lid is composed of aluminum, as are a majority of the percolators now on the open market.

In certain of the inventions of the prior art of which I am aware, efforts have been made to lock the top in the percolator by particularly shaping the apron of the top and particularly shaping the flange on the lid. When used together these particularly shaped units are fairly successful, but are, nevertheless, at a disadvantage in that a particular type of top is necessary for replacement in the particular percolator, and may not be available when needed, and the particular top will not satisfactorily work in a majority of the percolators for the reason that the flanges thereof are not shaped in the required manner.

Other prior art developments of which I am aware have attempted to solve the problem by providing a top shaped so as to be universal in its application, and provided with retaining means carried on the top for holding the top on the lid. These devices have not been altogether satisfactory for the reason that the retaining means have exerted pressure on the top in such a manner as to cause the top to be broken by expansion expended against the retaining means.

The present invention solves the problem of retaining the top upon the percolator by providing a top which is universal in that it may be fitted into any one of the existing percolator lids upon the market, and provided with a retaining means so designed as to securely hold the top in place upon the lid without stressing the top in such a manner as to cause it to be broken by expansion when it is heated.

To this end, in the preferred embodiment of the invention, the top is provided with an apron as before, upon the upper end of which is an outwardly projecting bead that serves to limit the movement of the apron into the opening in the lid. A metallic clip, composed of spring material, is provided and interposed between the apron and flange of the opening in the lid, and tensioned to exert a pressure radially of the apron and along a diameter therethrough, to hold the top in place in the lid. The pressures exerted by the retaining clip are so directed that the forces set up by expansion of the apron upon heating are against the hoop strength of the apron and against the resiliency of the spring clip. The arrangement thus provided securely holds the top in place on the lid without danger of breaking the top.

Referring now to the drawings in more detail, in Fig. 1 I have shown a top 10 conveniently shaped in the orthodox manner, although obviously any particular configuration of the upper part of the top may be employed within the teachings of the invention. The bead 11 extends around the top and abuts against the upper surface of the metallic lid 12 to limit the downward movement of the top with respect thereto.

The apron portion 13 of the top is shaped to fit in the opening in the lid, which opening is surrounded by a downwardly depending flange 14. Apron 13 is provided with lugs or bosses 15, preferably two in number, and located diametrically opposite each other. The hollowed out interior portion of the top is provided with a shoulder 16 located near the bead 11 and projecting inwardly for a purpose which will presently appear.

In the embodiment shown in Fig. 1 the retaining means comprises a metallic clip of the type more clearly shown in Fig. 2. This clip comprises a hook-like portion 17 adapted to extend around the bead 11 of the top on the outside thereof, and a generally U-shaped portion 18 depending from the hook-like portion and extending around the apron 13 of the top. The upper end of the inner arm 19 of the U portion abuts against the shoulder 16 to tension the clip so that it will project outwardly of the apron in the manner shown in dotted lines in Fig. 1 when not in engagement with the lid 12.

The outer arm of the clip is provided with an outwardly projected boss 20 spaced below the hook-like portion 17 sufficiently to permit the uppermost end of boss 20 to engage the lowermost end of the flange 14 when the top is in place in the lid.

Normally the clip, indicated generally at 21 in Fig. 3, is located adjacent to but not in registration with one of the lugs 15 on the apron. The top is placed upon the lid by registering the lugs 15 with the grooves or openings in the flange provided therefor, and then pushing the top downwardly with respect to the lid, forcing the clip 21 between the flange and apron and inwardly against its tension. In the event that the lid 12 is new and the flange 14 located in substantially its original position, further manipulation of the top with respect to the lid is not necessary. The tension of spring 21 will hold the top securely in the lid, and the boss 20, engaging the free edge of the flange 14, serves as a third retaining lug. However, if the lid 12 is old and the flange 14 has been backed away from the position in which it is shown in Fig. 1 by the expansion of previous tops used in connection therewith, the new top 10 is locked in place by rotating it with respect to the lid and clip 21 so as to bring a lug 15 into registration with boss 20. The lug 15 forces the clip 21 outwardly with respect to the apron and increases the pressure exerted by the clip upon the lid, thereby to securely lock the top in place on the lid.

It will be noted that the radius of the hook portion 17 of the clip is greater than the radius of the bead 11 around which it is disposed. When the clip is in registration with a lug 15 and the top is expanded by heat, the resiliency of that portion of the clip disposed between the boss 20 and the fulcrum point at the free end of the hook portion 17 takes up the expansion of the top so that the flange 14 of the lid is not damaged thereby.

By this arrangement I have found that tops may be securely fastened in lids which are so old as to be wholly incapable of holding ordinary tops provided only with opposed lugs, such as 15. By moving the clip 21 around the lid, a point can usually be found at which the top can be fastened into the lid without reshaping the flange 14 thereof.

The embodiment of the invention shown in Fig. 4 is substantially the same as that shown in Figs. 1 to 3, inclusive, except that the top member 10 is provided with an annular recess 25 disposed immediately above the bead 11. The hook portion 17 of the clip 26 is formed slightly longer so that the clip will be fitted in and fulcrum at the bottom of the recess 25. Except as above noted, this embodiment of the invention is the same as heretofore described and is advantageous in that there is no danger of the clip being displaced from the top when the percolator is being dried since the ends of the clip are disposed below the surface of the top and cannot catch upon the towel.

The embodiment of the invention shown in Fig. 5 is similar to that shown in Fig. 4, except that the groove 27 is located beneath the bead 11 and the clip 28, shown in detail in Fig. 6, is formed to fit in the groove 27 and does not extend above the bead of the top. The clip 28 is provided with a boss 29 with which the lug 15 of the apron of the top is registered as before, and the longer leg 30 of the clip abuts against the shoulder 16 in the top to tension the clip outwardly when it is not in engagement with a lid. The clip may also be provided with a lip 29' that projects outwardly to engage the upper face of lid 12 to locate the top with respect thereto. The use of a clip or clips of this type eliminates the necessity of having a bead 11 on the top, as the lip 29' will limit movement of the top with respect to the lid.

Oftentimes a percolator top is provided with two beads instead of one, and in Fig. 7 I have shown the clip of the present invention applied to a top of this type. The clip 31 is substantially the same as the clip shown in Fig. 2, except that the hooked portion 32 is formed on a shorter radius so as to enable it to encircle the smaller and lower bead 33 of the top 34. The top contains a shoulder 35 corresponding to the shoulder 16 heretofore described and against which the inner leg 36 of the clip abuts to place a normal outward tension in the clip. The clip is provided with a boss 37 with which the lug 38 of the top is registered to lock the top in place in the lid as before.

In certain instances it may be advantageous to provide a longer length of spring than the section shown in Figs. 1 to 4 and 7, inclusive, in which case the embodiment shown in Fig. 8 may be employed. Here the top 40 is provided with a bead 41, as before, and disposed above the apron portion 42. The top is also provided with a recess 43 which may be a groove running entirely around the top. The spring clip 44 is formed to fit in the groove 43 and formed to extend around the bead 41, but not to engage the same, that portion 45 of the clip being formed on a radius greater than the radius of the bead. The clip extends around the free end of apron 42 and abuts against a shoulder 46 disposed in the inner wall of the top so as to tension the clip outwardly. The clip of this type may be used with an apron employing lugs such as 15 heretofore described, which are registered with a boss 47 on the clip, in which case the operation of the clip is the same as heretofore described except that the length of spring between the boss 47 and the fulcrum point in groove 43 is greater.

With a clip of the type shown in Fig. 8 it is not necessary to depend upon the lugs 15 for retaining the top in place in a lid. The clip is long enough so that it may be normally tensioned to hold the top in place by the engagement of the boss 47 with the free edge of the flange 14 of the lid. In the arrangement thus formed the top is placed upon the lid and secured thereon merely by pushing down upon the top to force the apron through the opening in the lid and against the tension of clip 44 upon the flange. In order to permit a snap-on top of this type to be used when a cover or lid which is new and approximately up to standard size, it is advisable to provide a wedged shaped opening or slot 48 in the apron of the top. As the top is being forced downwardly with respect to the lid and boss 47 on the clip is riding over the face of the flange 14, the clip is pushed back into the recess 48 to permit the top to be registered with the lid without deforming the flange.

In a snap-on top of this type recess 43 is substantially the same length as the width of the clip, as will be apparent in Fig. 8, and since it is not necessary to provide for movement of the clip with respect to the top, and is in fact advantageous that it should not move with respect thereto out of alignment with the recess 48, the bead 41 may be provided with lugs 49 disposed on opposite sides thereof and projected outwardly sufficiently to overlap the hook-like portion 45 of the clip. Lugs 49 further serve to prevent a towel from being caught in the clip when the top is being dried.

Apron 42 of the top may be provided with a single lug, not shown, and located diametrically opposite the clip 44, or it may be provided without any lugs, in which latter case the top is held in the lid solely by friction. Since the spring is long, it has a sufficient resiliency to take up for expansion and contraction of the top, and the same will not be loosened thereby.

Each of the clips heretofore described has been normally tensioned outwardly so that when the top is out of engagement with the lid the clip is disposed with its inner arm, such as 19, Fig. 2, disposed against the inside surface of the apron. In certain instances it may be advantageous to tension the clip inwardly. In Figs. 10 and 11 I have shown such clips. In Fig. 10 it will be noted that the top 50 is provided with a bead 51, and apron 52, and a lug 53, as before. The clip has a hook-like portion 54 terminating at a fulcrum point at the junction of the upper face of the bead and the top, which hook-like portion is of a radius greater than the bead. The inner arm 55 of the clip is shorter than in the previously described clip and does not engage the shoulder 56 of the top. When not in engagement with the lug 53 on the top, the clip assumes the position shown in the dotted lines in Fig. 10.

The top is registered with the lid as before, and the clip held against movement with respect to the lid, while the top is turned with respect to the lid and clip to bring lug 53 into registration with the boss 57 in the clip. The clip is thus forced outwardly into engagement with the flange of the lid, to lock the top in place thereon.

In Fig. 11 I have shown a clip of the type shown and described in Fig. 4, provided with a short inner arm 58 which tensions the clip inwardly when not in engagement with the apron lug. Otherwise the clip shown in Fig. 11 is the same as has been heretofore described.

In Figs. 12 and 13 I have shown an embodiment of the invention employing a clip of the snap-on type, in which the top 60 is provided with an apron 61 that has a single lug 62. The top is also provided with a bead 63 which serves to position it with respect to the lid 12. As before, clip 65 has a long inner arm 66 which abuts against the shoulder 67 in the lid to tension the clip outwardly. The hook portion 68 of the clip is shown in Fig. 13 as being of the same type as the hook portion 17 of Figs. 1 and 2, it being understood that this showing is made by way of example only as the hook portion may be of the type shown in Fig. 4, or, if desired, of the type shown in Fig. 8. In any event, the radius of the hook-like portion 68 is greater than the radius of the bead so that the fulcrum point is at or above the bead.

Clip 65 is also provided with arms 69 which extend around the apron approximately half way, and are formed on a radius slightly less than the radius of the apron so that the arms fulcrum at their free ends. The clip is also provided with a boss 70 adapted to engage the free edge of the flange 14 of the lid.

The clip is tensioned outwardly by the combined tension of the long inner arm 66 and the tension of the side arm 69. When the top is registered with a lid the edge opposite the clip is inserted first so as to bring the lug 62 on the apron into engagement with the free lower edge of the flange 14 and then the side of the top containing the clip is pressed downwardly. The clip is forced over against the outer face of the apron against the tension of the spring element 66 and 69 by the engagement of boss 70 with the flange. When the boss passes below the flange the springs move the clip outwardly to lock the top in place upon the lid. Expansion and contraction of the top is compensated for by the combined action of springs 66 and 69.

In an arrangement of this kind it is imperative that the spring clip be maintained diametrically opposite the lug 62, and for this reason bead 63 is provided with outwardly extending lugs 71 which are located upon opposite sides of the hook portion 68 of the clip and serve to fix it with respect to the top. These lugs also serve to guard the clip against being caught by a towel when the top is being dried. The clips heretofore described are composed of high grade steel or brass which has sufficient resiliency to counteract the changes in tension occasioned by expansion and contraction of the top member. When formed of the proper material, which may be suitably plated or otherwise finished to add to its appearance, the clips will last indefinitely without breakage.

Throughout the drawings the lids 12 have been shown equipped with a flange 14 shown as a straight flange disposed substantially at right angles to the plane of the lid. In most cases where the lid is composed of aluminum or of a metal which is finished by plating, a flange of this type is used. However, on some lids, the flange is formed as a bead of arcuate section. The tops of the present invention will work with this latter type of flange in the same manner as hereinbefore explained. In the case of percolators formed of enamel ware, and having porcelain coated tops, no flanges are provided. The clips of the present invention have been found to securely hold the tops in a lid of this type, the top being held in the lid solely by friction. The lugs on the apron of the tops and bosses on the clips, do not normally engage the lids, but are spaced therefrom and serve merely as safety stops.

In the drawings the particular shape of the tops above the beads has been omitted since insofar as the present invention is concerned, this portion of the top may be of any desired shape.

The bosses 20, Figures 2 and 3, and the boss 37, Figure 7, and the boss 57, Figure 10, may be replaced by a perforation having a width slightly less than the width of the lug on the tops. Thus when the lug is registered with the clip, the clip will be locked in the same manner as before, that is by the projection of the lug into and through the plane of the main body of the clip.

Thus it will be seen that I have provided a new top for percolators and the like, which has several points of advantage. Tops formed to a standard size may be used with any percolator calling for a top of that size irrespective of the condition of the flange of the percolator. No special devices are required to be upon the lid in order to securely fasten the top therein, and the top, which is equipped with a clip of the present invention, is therefore universal in its adaptation. If desired, clips may be sold separately from the tops although it is preferable that in the teachings of the invention the top and clip be combined together as an article of manufacture.

Having thus shown and described my invention by way of example, I am not to be limited thereby as there are many modifications and adaptations which can be made by one skilled in the art within the teachings of the invention. What is claimed to be new is shown in the attached claims.

What is claimed is:

1. In combination with a percolator top having a hollowed out portion, a bead projecting outwardly from the top, a shoulder projecting into the hollowed out portion, of a spring clip extending from the bead around the open end of the top to the shoulder and tensioned to exert a pressure outwardly for holding the top upon a lid.

2. The combination with a percolator top having a hollowed out portion, a bead projecting outwardly from the top, a shoulder projecting into the hollowed out portion, there being a groove in the top above the bead, of a spring fitted in the groove and extending around the bead and into the open end of the top and terminating against the shoulder, said spring being tensioned to exert a pressure outwardly of the top for holding the same upon a lid.

3. The combination with a percolator top having a hollowed out portion, a bead projecting outwardly from the top, a shoulder projecting into the hollowed out portion, there being a groove in the top above the bead, of a spring fitted in the groove and extending around the bead and into the open end of the top and terminating against the shoulder, said spring being tensioned to exert a pressure outwardly of the top for holding the same upon a lid, and lugs projecting from the bead on opposite sides of the spring for holding the spring fixed with respect to the top.

4. In combination with a percolator top having a hollowed out portion, a bead projecting outwardly from the top, a shoulder projecting into the hollowed out portion, there being a groove in the top extending from the open face thereof toward said bead, of a spring clip registered with said groove and extending from the bead around the open end of the top to the shoulder, a boss on said spring opposite said groove which pushes the spring into the groove as the top is pushed into an opening in the lid, said spring being tensioned outwardly to maintain the top upon the lid.

5. A percolator top comprising a bead and a depending apron, shoulders on said apron forming a wedge-shaped recess opening into the free edge of the apron and extending toward said bead, spring means disposed over said recess and extending from said bead around the free end of the apron and into the top, means within the top for tensioning said spring means to exert pressure outwardly of the top, and a shoulder on the spring means for pushing the same into said recess as the top is registered with a lid, said shoulder subsequently engaging the lid to hold the top thereon.

6. In combination with a lid having a flanged circular opening, a top member, a cylindrical apron on said member formed to fit in said opening alongside of said flange, independent spring means extending between the apron and flange, and means to tension the spring to exert pressure therebetween radially of the apron for holding the top on the lid.

7. In combination with a lid having a flanged opening, a top member, an apron on said member formed to fit in said opening alongside of said flange, a bead on said member for locating the member with respect to the lid, and independent spring means fulcrumed adjacent to said bead and extending between said apron and flange the tension of the spring exerting pressure therebetween for holding the top member on the lid.

8. In combination with a lid having a flanged opening, a top member, an apron on said member formed to fit in said opening alongside of said flange, a bead on said member for locating the member with respect to the lid, spring means extending from said bead between said apron and flange, and means on the apron for tensioning said spring means to exert pressure between the apron and flange for holding the top member on the lid.

9. As an article of manufacture, a percolator top comprising a hollow generally conical section, a hollow generally cylindrical section, a bead separating said sections and projecting outwardly of said cylindrical section, and spring means hooked over said bead and extending alongside said cylindrical section past the free end thereof and into the top.

10. As an article of manufacture, a percolator top comprising a hollow generally conical section, a hollow generally cylindrical section, a bead separating said sections and projecting outwardly of said cylindrical section, and a generally U-shaped spring clip extending from said bead around the free end of the cylindrical section and into the top and tensioned to exert pressure outwardly therefrom.

11. As an article of manufacture, a generally U-shaped spring, a hook formed at one end of said spring and adapted to engage the bead of a percolator top, and a boss disposed on the leg of said spring adjacent to said hook and extending outwardly therefrom.

12. A percolator lid having a flanged opening, a glass top therefor, an apron on said top extending through said opening and beyond the flange, an independently movable spring clip disposed between the apron and the flange, and a lug on the apron registered with said clip by rotating the top with respect to the clip and lid for tensioning the clip to exert pressure on the flange and retain the top in the lid.

13. A percolator top, a bead on said top, an independently movable spring clip fulcrumed at a junction of said top and bead and tensioned to exert pressure outwardly from the top, and means on the top moved into engagement with the clip by a rotation of the top with respect thereto for increasing the tension of said spring clip.

14. A percolator top, a depending apron thereon, a bead projecting outwardly from the junction of the top and apron, a movable spring clip fulcrumed at the junction of the top and bead and extending around the apron to engage the inner face thereof, and a lug on the apron wedged between the clip and apron by a rotation of the top to force the clip outwardly of the top.

15. In combination with a lid having an opening, of a top for said lid, an apron on said top adapted to fit in said opening and independent spring means arranged to contact the lid opening and extending around and beneath the apron.

16. In combination with a lid having an opening, a flange surrounding said opening, of a top for said lid, an apron on said top adapted to fit in said opening, and independent spring means arranged to contact the lid opening and extending around and beneath the apron.

17. An attachment for a percolator top comprising, a spring clip, a projection on said clip for engaging a recess in a percolator top, and a downwardly extending part bent to form an upwardly extending part.

18. An attachment for a percolator top comprising a spring clip having a part for engaging the bead of a percolator top, a downwardly extending part bent to form an upwardly extending part longer than the downwardly extending part.

19. In combination with a lid having an opening, a flange surrounding said opening, of a top for said lid, an apron on said top adapted to fit in said opening, and independent spring means having a part located between the lid flange and the apron and extending on one side and around the bottom edge of said apron.

20. In combination with a lid having an opening, a flange surrounding said opening, of a top for said lid, an apron on said top adapted to fit in said opening, and independent spring means including a boss for engaging the usual projection on the apron.

21. In combination with a lid having an opening, a top for said lid, an apron on said top adapted to fit in said opening and independent spring means including means for engaging a projection on the apron to hold the spring and projection in operative relation.

22. In combination with a lid having an opening, a flange surrounding said opening, of a top for said lid, an apron on said top adapted to fit in said opening, and independent spring means, said spring means carrying a projection to engage a recess in the apron below the bead and extending around and beneath the apron.

23. In combination with a lid having an opening, a flange surrounding said opening, of a top for said lid, an apron on said top adapted to fit in said opening, a bead on the top, independent spring means on said top, and a projection on said spring means adapted to engage a recess in the top above the bead.

24. In combination with a lid having an opening, a hollow top for said opening, said top having a recess in its wall, and independent spring means having a portion to engage in said recess and extending around and beneath the top.

25. A percolator top having a hollow portion creating an apron, said apron having a depression in its wall, a movable spring having a part to fit in said depression and an oppositely extending part to contact a lid, when said top is inserted in an opening in said lid.

26. An attachment for a percolator top comprising a spring clip having a part for engaging the bead of a percolator top, a downwardly extending part bent to form an upwardly extending part.

27. An attachment for a percolator top comprising a spring clip having a part for engaging the bead of a percolator top, a downwardly extending part, a boss on said downwardly extending part, said spring clip being bent below said boss to form an upwardly extending part.

28. An attachment for a percolator top comprising, a spring clip, a projection on said clip for engaging a recess in a percolator top, and a downwardly extending part bent to form an upwardly extending part longer than the downwardly extending part.

29. An attachment for a percolator top comprising a spring clip having a part for engaging a percolator top, a downwardly extending part, a boss on said downwardly extending part, the spring clip being bent below said boss to form an upwardly extending part longer than the downwardly extending part.

EMIEL P. SEGHERS.